J. W. SCHATZ.
BALL BEARING.
APPLICATION FILED APR. 29, 1915.

1,176,169.

Patented Mar. 21, 1916.

Witnesses:
A. R. Appleman
F. W. Duulach

Inventor
John W. Schatz
By his Attorney Phillips Abbott

UNITED STATES PATENT OFFICE.

JOHN W. SCHATZ, OF POUGHKEEPSIE, NEW YORK, ASSIGNOR OF ONE-THIRD TO HERMAN A. SCHATZ AND ONE-THIRD TO GROVER H. SCHATZ, BOTH OF POUGHKEEPSIE, NEW YORK.

BALL-BEARING.

1,176,169.   Specification of Letters Patent.   Patented Mar. 21, 1916.

Application filed April 29, 1915. Serial No. 24,663.

*To all whom it may concern:*

Be it known that I, JOHN W. SCHATZ, a citizen of the United States, and a resident of the city of Poughkeepsie, county of Dutchess, and State of New York, have invented certain new and useful Improvements in Ball-Bearings, of which the following is a specification.

This invention relates to improvements upon the annular ball bearing patented in and by United States Letters Patent, No. 1,073,529 dated September 16, 1913, on an application filed by me, and has special reference to structural changes in the exterior jacket and the race rings supported thereby which materially strengthen the parts referred to and facilitate the manufacture.

More specifically described, the invention consists in reducing the edges of the exterior jacket which are spun, swaged, or otherwise pressed upon and made to embrace and firmly hold the race rings and also in changing the angle of the exterior surfaces of the race rings which engage with the interior surface of the jacket, so that when finished, the bearing will have greater strength and improved appearance.

Figures 1, 3:
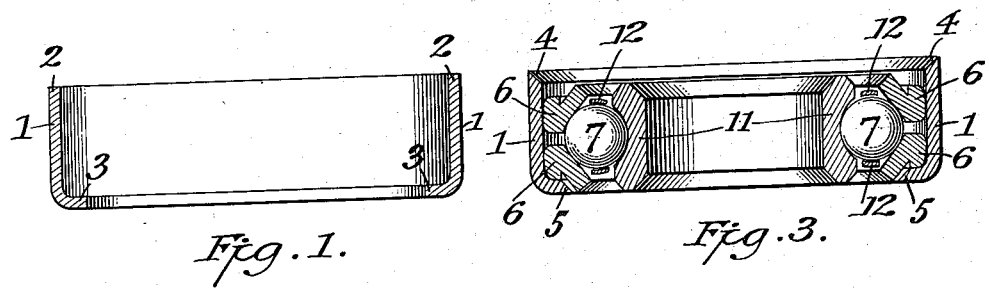
Figures 2, 6:
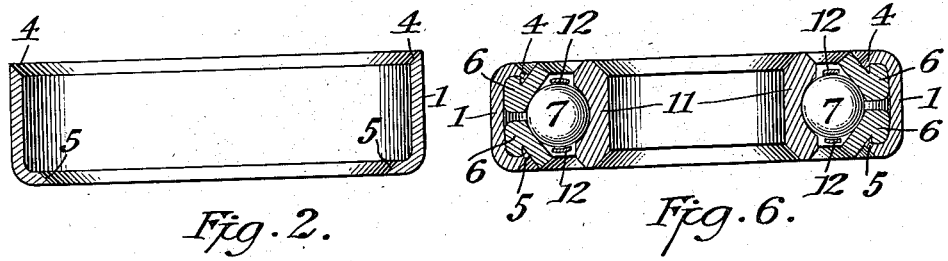
Figure 4:
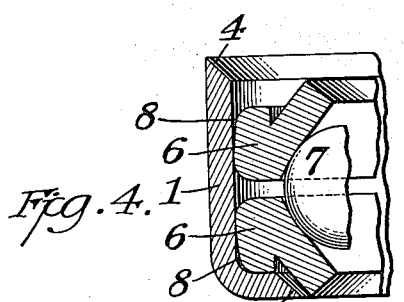
Figure 5:
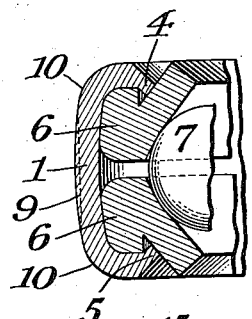
Figure 7:
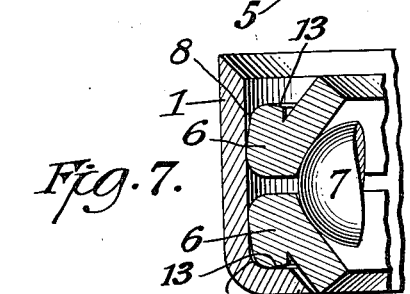
Figure 8:
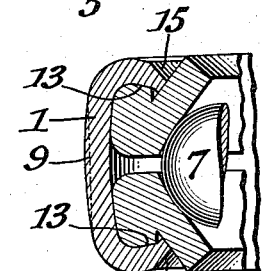

In the drawings, Figure 1 is a sectional view of the jacket as shown in the patent above referred to; Fig. 2 is a view the same as Fig. 1 of the exterior jacket, the edges whereof are chamfered off; Fig. 3 is a sectional view of the parts composing the bearing as assembled within the jacket, which has not yet been swaged, spun, or otherwise pressed against the race rings; Fig. 4 is a sectional view, somewhat enlarged, showing more plainly than in the other figures the angular outer surfaces of the outer race rings and the relation the jacket and the rings bear to each other before the jacket has been spun, swaged, or otherwise pressed against the race rings; Fig. 5 is a view similar to Fig. 4, showing the jacket as swaged, spun, or otherwise pressed against the race rings so as to embrace them and indicating by dotted lines the line of grinding to finish the exterior of the jacket to dimension; Fig. 6 is a sectional view similar to Fig. 3, showing the completed bearing; Fig. 7 is a sectional view similar to Fig. 4, but showing the lateral edges of the race rings as well as their outer surfaces beveled off at an angle; Fig. 8 is a sectional view showing the construction of Fig. 7 when the bearing is completed.

In the drawings 1 represents the exterior jacket. In Fig. 1 it is shown as represented in the prior patent referred to, in which the edges 2 and 3 are left square, in other words, having the full thickness of the metal. It has been found in practice that when the attempt is made to spin, swage, or otherwise press these edges having the full thickness of the metal inwardly and to bring them in suitable contact with the exterior surfaces of the race rings, as explained in the patent referred to, the resistance of the edges of the metal, when they come in contact with the exterior surfaces of the race rings, is such as to cause a slight outward expansion or buckling of the metal at the outer corners of the jacket, so that a snug, hugging contact between the race rings and the jacket is not secured. After much experimentation, I have found that this difficulty can be corrected if the edges of the jacket which are to be turned inwardly and brought in snug, hugging contact with the inclined exterior surfaces of the race rings, be beveled off or thinned somewhat, as shown at 4, 4, and 5, 5, in Fig. 2, then when the parts are assembled, they will appear as shown in Fig. 4, in which the edges of the jacket are shown as beveled off and of course reduced in thickness, so that when they are spun, swaged, or otherwise forced inwardly and brought in contact with the exterior surface of the race rings, they will be upset or crushed backwardly to a degree, so that they will present substantially the appearance shown at 4 and 5, respectively, in Fig. 5.

I have further discovered that the snug, binding engagement between the jacket and the race rings and the strength of the bearing as a whole may be materially augmented by a further improvement, that is to say, instead of having the exterior surfaces of the race rings flat and parallel with the adjacent interior surface of the jacket, I bevel off the exterior surface of each ring so that they are presented at a slight inner angle relative to the axis of the bearing; by that I mean that the outer or peripheral surface of each ring is inclined from the medial line of the bearing inwardly toward the axis of the bearing, so that prior to the spinning, or other forcing of the jacket down upon them, there will be very acute angular spaces 8, 8, (see Fig. 4) between the exterior or peripheral surfaces of the race rings and the interior of the jacket and other acute angular spaces 13, 13, between the lateral edges of the race rings and the interior of the jacket, and when the latter is spun, or otherwise forced against the race rings and its inner edges 4 and 5 are turned in, as above described, the outer surface of the jacket will assume a slightly crowning shape, as illustrated best in Figs. 5 and 8, thus enabling me to accomplish a very important result, that is to say, in grinding down or finishing the exterior of the jacket in order to bring it to dimension, so that it may accurately fit the structure or recess in which it is to be employed, the grinding will be along the dotted line 9 indicated in Figs. 5 and 8, and it will be particularly noted that the grinding will run out or vanish at or near the corners 10, 10, see Fig. 5, of the jacket, leaving at these points, which are the ones requiring the greatest strength, to total thickness of the metal, no reduction thereof at these points being necessary.

In Fig. 3 the inner race is shown at 11, and a spacer, if one be used, at 12.

In addition to the advantages referred to, other new and important results are secured, that is to say, the contacting surfaces, i. e., the outer surfaces of the race rings and the inner surface of the jacket, constitute in effect double inclines toward the medial line of the bearing, so that a keying effect results which materially aids in preventing separation, spreading, or any other movement of the race rings, and it is found that this keying effect materially enhances the resistance to such pressures due to the retention of the full thickness of the metal in the jacket at the corners of the bearing and its turned in edges, which embrace the race rings.

Although I prefer to bevel or arrange at an angle both the peripheral and the lateral or edgewise surfaces of the race rings, as shown in Figs. 7 and 8, it is not essential that they both should be so shaped, because substantial advantages will be secured if the peripheral surfaces only, or if the lateral or edgewise surfaces only be thus beveled or presented angularly. This feature, so far as I know, is fundamentally new in the manufacture of ball bearings and I know it to be one of marked value and in the claims hereof I wish to protect myself broadly in this respect. It will of course be understood that this feature of my invention may be advantageously employed whether the extreme edges of the jacket are made sufficiently long to bear against and thus support the race rings, or whether they do not reach so far, but simply embrace the lateral surfaces of the race rings and thus hold them in position together with stiffening the jacket.

It will be obvious to those who are familiar with such matters that modifications may be made in the details of construction or arrangement of the parts and yet the essentials of the invention be retained. I therefore do not limit myself to the details as described and illustrated.

I claim:

1. As a new article of manufacture, a ball bearing having two outer race rings, the exterior or peripheral surface of each of which is presented at inner angles relative to the axis of the bearing, a sheet metal jacket, which embraces the exterior angular surfaces of the race rings, the edges of the jacket being forced against the inclined outer surfaces of the race rings and also about the lateral edges thereof, an inner race member, and balls between the race rings and the inner race member.

2. As a new article of manufacture a ball bearing having two outer race rings, a sheet metal jacket the extreme edges of which are beveled, the sides of the jacket being forced about and made to inclose the lateral edges of the race rings and the beveled extremities thereof brought in contact with the inclined outer surfaces of the race rings, an inner race member, and balls between the outer race rings and the inner race member.

3. As a new article of manufacture, a ball bearing having two outer race rings, the exterior or peripheral surface of each of which is presented at inner angles relative to the axis of the bearing, a sheet metal jacket the extreme edges of which are beveled, the sides of the jacket being forced about and made to embrace the lateral edges of the race rings and the beveled extremities brought in contact with the race rings, an inner race member, and balls between the exterior race rings and the inner race member.

4. As a new article of manufacture, a ball bearing having two outer race rings, the exterior or peripheral surface of each of which is presented at inner angles relative to the axis of the bearing, a sheet metal jacket, which embraces and snugly fits the exterior surfaces of the race rings and the sides of which embrace the lateral edges of the race rings, the outer surface of the jacket being ground flat to dimension, leaving substantially the full thickness of the metal at the lateral corners of the race rings, an inner race member, and balls between the exterior race rings and the inner race member.

5. As a new article of manufacture, a ball bearing having two outer race rings, the exterior or peripheral surface of each of which is presented at inner angles relative to the axis of the bearing, a sheet metal jacket, which embraces and snugly fits the exterior surfaces of the race rings, and the extreme edges of which jacket are beveled, the sides of the jacket being turned inwardly and made to embrace the lateral edges of the race rings and the beveled extremities brought in contact with the race rings, the outer surface of the jacket being ground to dimension, leaving substantially the full thickness of the metal at the lateral corners of the race rings, an inner race member, and balls between the exterior race rings and the inner race member.

6. As a new article of manufacture, a ball bearing having two outer race rings, the exterior or peripheral surfaces of which are presented at inner angles relative to the axis of the bearing, a sheet metal jacket or band for the support of the race rings which is pressed against and makes contact with their exterior or peripheral angular surfaces, an inner race member, and balls between the race rings and the inner race member.

7. As a new article of manufacture, a ball bearing having two outer race rings, the exterior or peripheral and also the lateral or edgewise surfaces of which are presented at angles respectively relative to the axis of the bearing, a sheet metal jacket which embraces and snugly fits the exterior or peripheral and the lateral or edgewise surfaces of the race rings, an inner race member, and balls between the exterior race rings and the inner race member.

8. As a new article of manufacture, a ball bearing having two outer race rings, the lateral or edgewise surfaces of which are presented at inner angles relative to the axis of the bearing, a sheet metal jacket which embraces and snugly fits the exterior surfaces of the race rings, an inner race member, and balls between the exterior race rings and the inner race member.

9. As a new article of manufacture, a ball bearing having two outer race rings, the exterior or peripheral and lateral or edgewise surfaces of which are presented at angles respectively relative to the axis of the bearing, a sheet metal jacket, which embraces and snugly fits the exterior or peripheral and the lateral or edgewise surfaces of the race rings, the extreme edges of which jacket are beveled and turned inwardly and brought in contact with the race rings, the outer or peripheral surface of the jacket being ground to dimension, an inner race member, and balls between the exterior race rings and the inner race member.

In testimony whereof I have signed my name to this specification.

JOHN W. SCHATZ.